United States Patent
Han

(10) Patent No.: US 7,527,270 B2
(45) Date of Patent: May 5, 2009

(54) MACHINE TOOL ARBOR FITTED FOR TOOL-LESS CHUCKING

(76) Inventor: Sil Han, 321 Sunset Dr., Wilmette, IL (US) 60091

(*) Notice: Subject to any disclaimer, the term of this patent is extended or adjusted under 35 U.S.C. 154(b) by 0 days.

(21) Appl. No.: 11/145,681

(22) Filed: Jun. 3, 2005

(65) Prior Publication Data

US 2005/0280216 A1    Dec. 22, 2005

(51) Int. Cl.
   *B23B 31/20*    (2006.01)
   *B23B 31/30*    (2006.01)
(52) U.S. Cl. .................. 279/2.02; 279/2.01; 279/2.1; 279/2.12; 269/48.1; 242/596.5; 242/596.6
(58) Field of Classification Search ............. 279/2.02, 279/2.1, 2.12, 2.01, 2.03, 2.04, 2.05, 2.11, 279/2.19, 42, 47, 48, 52, 136; 269/48.1; 242/596.5, 596.6, 596, 596.1, 596.4
See application file for complete search history.

(56) References Cited

U.S. PATENT DOCUMENTS

| | | | | |
|---|---|---|---|---|
| 1,648,032 A * | 11/1927 | Starkin | .................. | 82/169 |
| 2,360,968 A * | 10/1944 | Mundy | .................. | 82/169 |
| 2,398,278 A * | 4/1946 | Bailey | .................. | 82/152 |
| 2,499,781 A * | 3/1950 | Rothenberger | .............. | 279/2.12 |
| 2,541,078 A * | 2/1951 | Lescallette | .................. | 451/381 |
| 2,573,928 A * | 11/1951 | Peter | .................. | 279/2.11 |
| 2,734,749 A * | 2/1956 | Benjamin | .................. | 279/2.03 |
| 2,914,330 A * | 11/1959 | Wheeler | .................. | 279/2.03 |
| 3,165,279 A * | 1/1965 | Remington | .................. | 242/130 |
| 3,385,147 A * | 5/1968 | Eisele | .................. | 82/169 |
| 3,574,385 A * | 4/1971 | Pignataro, Jr. | ............ | 294/86.25 |
| 3,638,979 A * | 2/1972 | Francois et al. | .............. | 403/281 |
| 3,665,657 A * | 5/1972 | Lill | .................. | 451/397 |
| 3,704,640 A * | 12/1972 | Forsstrom | .................. | 82/169 |
| 3,990,690 A * | 11/1976 | Lick | .................. | 269/48.1 |
| 4,720,114 A * | 1/1988 | Braitmaier et al. | ......... | 279/2.23 |
| 4,916,792 A * | 4/1990 | Haubus | .................. | 29/262 |

(Continued)

FOREIGN PATENT DOCUMENTS

JP        63191509 A  *  8/1988

(Continued)

*Primary Examiner*—Monica Carter
*Assistant Examiner*—Michael W. Talbot
(74) *Attorney, Agent, or Firm*—Leighton K. Chong

(57) ABSTRACT

A machine tool arbor for holding a rotating machine part or workpiece is fitted with an actuator member at a back or distal end of an arbor main body for tool-less chucking and unchucking of a machine part or workpiece at a front or proximate end of the arbor main body. An actuator ring or knob is mounted at the back end of the arbor main body which, when rotated in one direction, causes an pusher member (collet pusher part, hydraulic piston) to move in such a manner as to displace a chuck member (inclined collet, flex collet, expansion ring) and release the machine part or workpiece that is chucked. When rotated in the opposite direction, the actuator knob causes the actuator member to move in an opposite manner as to fix the chuck member in a position to firmly hold the machine part or workpiece to be chucked. With this fitting, the machine part or workpiece can be chucked and unchucked by convenient operation of the actuator knob at the back end of the arbor without the need for using a special chucking tool.

4 Claims, 3 Drawing Sheets

U.S. PATENT DOCUMENTS

| | | | | |
|---|---|---|---|---|
| 5,074,536 | A * | 12/1991 | McConkey | 269/43 |
| 5,133,566 | A * | 7/1992 | Baker | 279/156 |
| 5,149,111 | A * | 9/1992 | Han | 279/2.03 |
| 5,595,376 | A * | 1/1997 | Hua | 269/48.1 |
| 6,568,889 | B2 * | 5/2003 | Rohm | 409/233 |
| 6,739,600 | B1 * | 5/2004 | Dillon et al. | 279/2.02 |
| 6,862,785 | B2 * | 3/2005 | Baumgartner | 29/26 A |
| 2006/0055125 | A1 * | 3/2006 | Ohnesorge | 279/2.12 |

FOREIGN PATENT DOCUMENTS

WO     WO9215418 A1 * 9/1992

* cited by examiner

MACHINE TOOL ARBOR FITTED FOR TOOL-LESS CHUCKING

TECHNICAL FIELD

This invention generally relates to a machine tool, and more particularly, to an arbor for such machine tool that allows chucking without using a tool.

BACKGROUND OF INVENTION

In conventional machine tools, such as lathes, drill presses, milling machines, cutters, grinders, gear forming or inspection equipment, etc., a workpiece or tool must be gripped securely and rotated precisely in alignment with a turning axis of the machine tool. For a workpiece or tool with a bore or center hole of a given inside diameter, an arbor typically has a collet as an outward expansion element which is pressed radially outwardly against the internal sides of the bore or center hole by the inclined faces of an arbor body movable axially relative to the expansion element. A desired objective for such arbor is to be able to expand and release the expansion element to hold a given inside or outside diameter uniformly and with a minimum of offset or distortion, such that the workpiece or tool is repeatedly gripped by the expansion pressure as precisely evenly as possible and rotated with its center axis in precise alignment with the machine tool axis. In conventional assemblies, a special chucking tool is required to open or close the arbor, requiring the operator to keep the chucking tool on the bench within reach at all times. This can be inconvenient for an operator who is busy handling a difficult to maneuver workpiece or has a busy bench. Therefore, it is a desired object of the present invention to provide an arbor for such machine tool that allows chucking without using a tool.

SUMMARY OF INVENTION

A machine tool arbor for holding a rotating machine part or workpiece is fitted with an actuator member at a back or distal end of an arbor main body for tool-less chucking and unchucking of a machine part or workpiece at a front or proximate end of the arbor main body. An actuator ring or knob is mounted at the back end of the arbor main body which, when rotated in one direction, causes an pusher member (collet pusher part, hydraulic piston) to move in such a manner as to displace a chuck member (inclined collet, flex collet, expansion ring) and release the machine part or workpiece that is chucked. When rotated in the opposite direction, the actuator knob causes the actuator member to move in an opposite manner as to fix the chuck member in a position to firmly hold the machine part or workpiece to be chucked. With this fitting, the machine part or workpiece can be chucked and unchucked by convenient operation of the actuator knob at the back end of the arbor without the need for using a special chucking tool.

Other objects, features, and advantages of the present invention will be explained in the following detailed description of the invention having reference to the appended drawings.

DETAILED DESCRIPTION OF THE INVENTION

The present invention relates to a fitting for tool-less chucking and unchucking of a machine tool arbor for holding a rotating machine part or workpiece. The machine tool arbor is a well-known equipment in the machine tool industry, for example, as described in commonly owned U.S. Pat. No. 5,149,111 issued on Sep. 22, 1992, to the same inventor, the entire description of which is incorporated by reference herein. The present application is directed to fitting the machine tool arbor with an actuator member at a back or distal end of the arbor main body for tool-less chucking and unchucking of a machine part or workpiece at a front or proximate end of the arbor main body.

Figure 1:
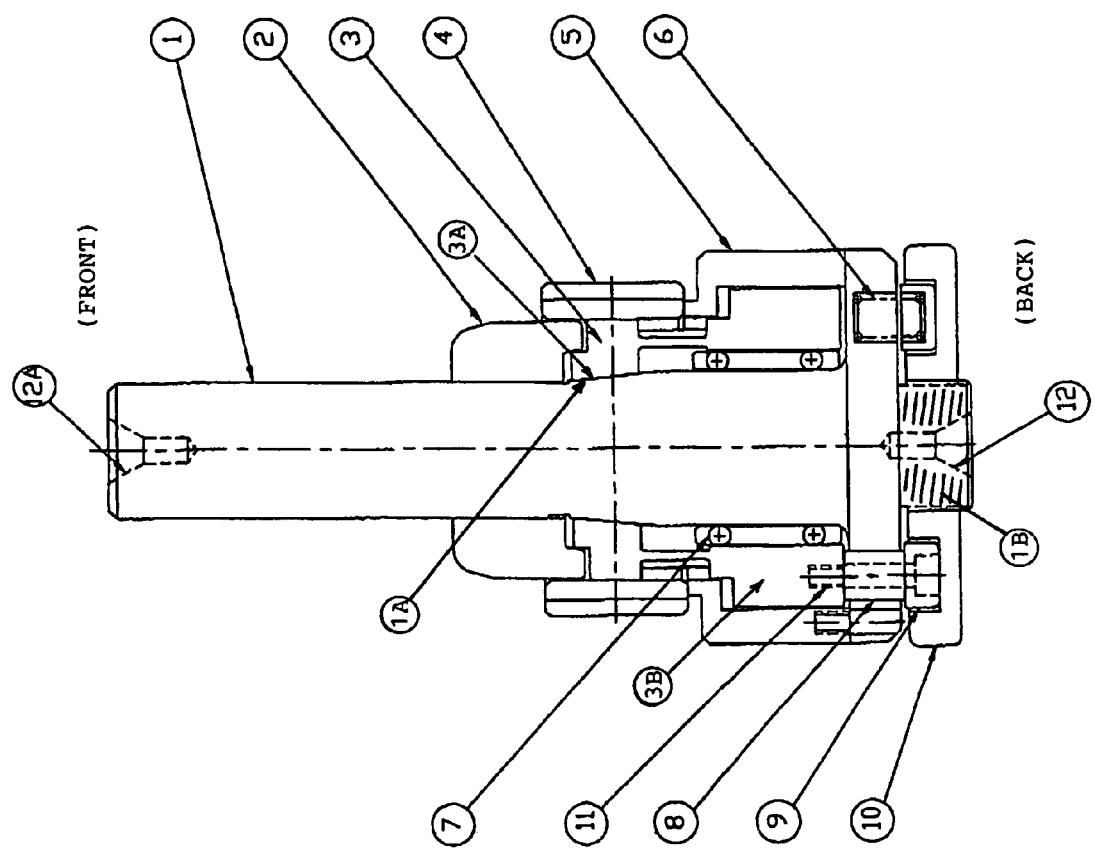
FIG. 1 is a schematic diagram of a first embodiment of a machine tool arbor for tool-less chucking in accordance with the present invention.

Referring to FIG. 1, a first embodiment of the machine tool arbor (referred to as Type A) in accordance with the present invention comprises the various parts as identified on Table I. The machine tool arbor includes an arbor main body 1, a collet cap 2, a displaceable collet 3 having an inclined inner wall 3A in abutment with a matching inclined wall 1A formed on the front end (toward the upper side in the figure) of the arbor main body, a machine part 4 such as a variable sized gear or workpiece that is to be chucked and unchucked, and a spacer 5 for locating the gear 4 in its proper machine position. An actuator member 10 such as a knurled ring or knob is threaded on threads 1B formed at the back end of the arbor main body so as to move along a longitudinal axis in parallel with the arbor main body. The actuator 10 is coupled through a ring 9 serving as a spring guide pocket, compression spring 6, spacing rod 8, and socket head cap screw 11 to a collet pusher part 3B which is flexibly connected to the collet 3 and slidable on ball bushings 7 along the longitudinal axis of the arbor. Arbor guides 12, 12A allow the arbor to be located on centers onto the machine.

In operation, the user rotates the knurled ring 10 clockwise by hand, moving the ring 9, spacing rod 8, collet pusher part 3B, and collet 3 in the frontward direction, thereby causing the collet 3 to move upward along the inclined wall of the arbor main body to collapse in a disengaged position so that the gear 4 can be released. When the knurled ring 10 is rotated in the opposite direction counter-clockwise, the collet 3 is moved in the rearward direction, sliding downward along the inclined wall of the arbor main body to wedge against the inner wall of the gear 4 to chuck it in the engaged position.

Figure 2:
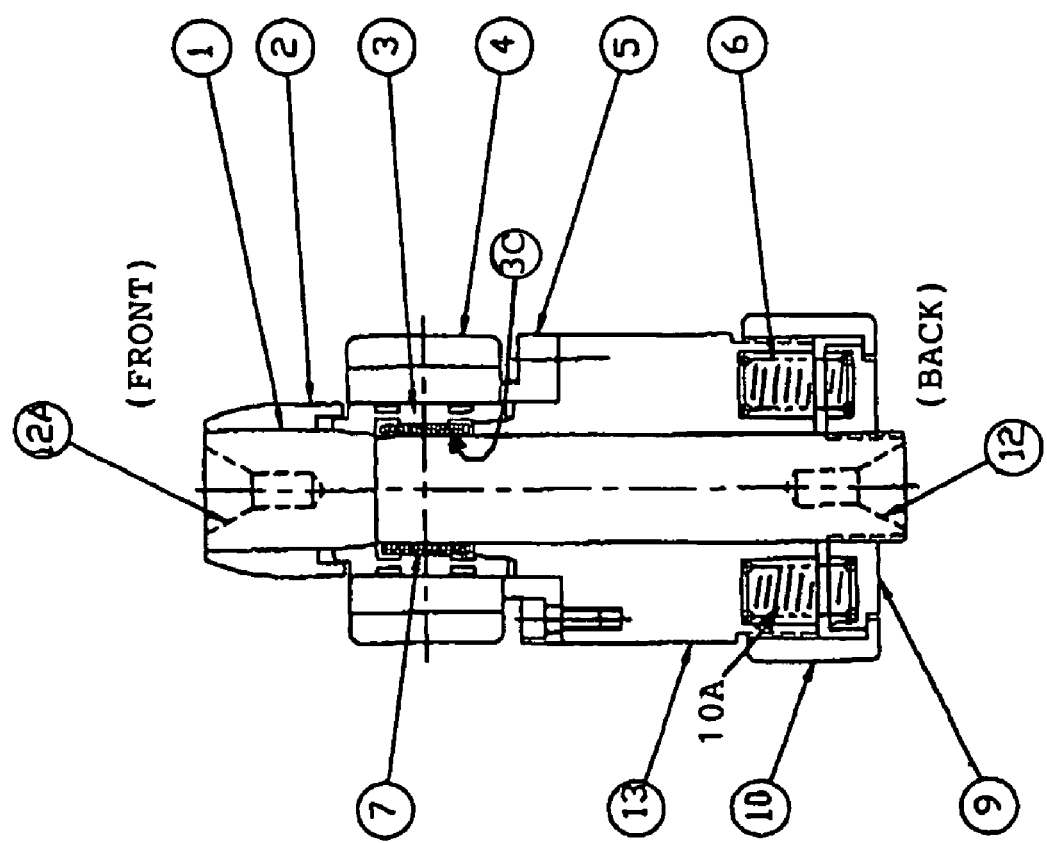
FIG. 2 is a schematic diagram of a second embodiment of a machine tool arbor.

Referring to FIG. 2, a second embodiment of the machine tool arbor (Type B) has similar parts as the first embodiment, except that the knurled ring 10 is rotatably mounted in a stationary position at the back end of the arbor main body 1 and has threads 10A engaged with threading formed on the back end of the pusher member 13 so as to move it along the longitudinal axis in parallel with the arbor main body. The pusher member 13 is coupled to the collet 3 which is formed as double-band flex collet member 3C having flex sections which can expand or collapse when pushed or released by the pusher member 13. Thus, when the knurled ring 10 is rotated in the clockwise direction, it pulls on the pusher member 13, and the flex collet member is collapsed and the gear 4 is unchucked, and when the knurled ring 10 is rotated in the counter-clockwise direction, it pushes on the pusher member 13, and the flex collet member is expanded and the gear 4 is chucked.

Figure 3:
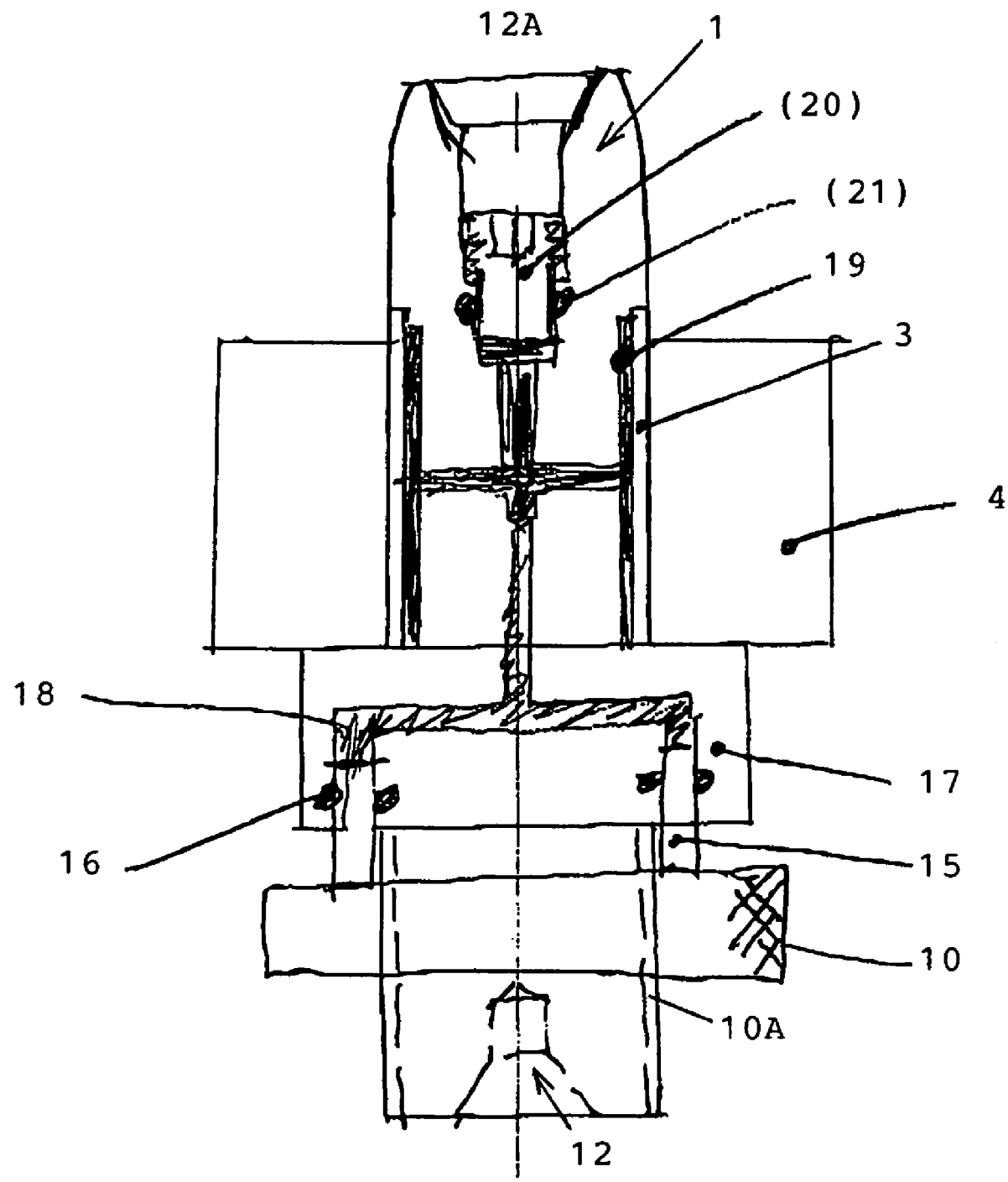
FIG. 3 is a schematic diagram of a third embodiment of a machine tool arbor.

Referring to FIG. 3, a third embodiment of the machine tool arbor (Type C) has similar parts as the above-described embodiments, except it employs a hydraulic actuator system for expanding and collapsing the collet. The conventional hydraulic actuator requires a special chucking tool to be inserted in the front arbor guide 12A and turned to push/release the threaded member 20 past O-ring 21 to compress/release hydraulic fluid in the hydraulic channels 19 in contact against the flex collet ring 3, which can collapse or expand in response to release or increase of hydraulic fluid pressure. In the present embodiment, the knurled ring 10 is rotated with inner threads engaged with threading 10A on the back end of the arbor main body 1. It abuts against piston members 15 which slide past O-rings in hydraulic body 17 having hydraulic channels 18 communicating with the channels 19 against the flex collet ring 3. When the knurled ring 10 is rotated counter-clockwise, the piston members 15 are moved rearward to uncompress the hydraulic fluid and collapse the flex collet ring to unchuck the machine part or workpiece. When it is rotated clockwise, the piston members 15 are moved in a forward direction to compress the hydraulic fluid and expand the flex collet ring 3 to an engaged position to firmly hold the machine part or workpiece to be chucked.

It is understood that many modifications and variations may be devised given the above description of the principles of the invention. It is intended that all such modifications and variations be considered as within the spirit and scope of this invention, as defined in the following claims.

The invention claimed is:

1. A machine tool arbor for holding a rotating machine part or workpiece fitted with an actuator member for tool-less chucking and unchucking of a machine part or workpiece, comprising:

an arbor main body extending longitudinally along a longitudinal axis from a back or distal end to a front or proximate end;

a collet having a radially displaceable member for chucking and unchucking a machine part or workpiece sleeved thereon, said collet having an inclined inner wall inclined toward the back end of the arbor main body that is adapted to be pushed and released from or into abutment with a matching inclined wall formed on a part of the arbor main body inclined toward the front end thereof, a collet pusher member having a longitudinally extending part coupled to said collet to move it in forward and rearward directions along the longitudinal axis of the arbor main body when said collet pusher member is moved in corresponding directions, an actuator member threaded on threads formed on an exterior surface on the back end of the arbor main body and coupled to the collet pusher member to move it in forward and rearward directions, such that when the collet pusher member is moved in the forward direction, it causes the inclined inner wall of the collet to move forward and release from the inclined wall of the arbor main body to collapse the radially displaceable member to a radially disengaged position for unchucking the machine part or workpiece, and when the collet pusher member is moved in the rearward direction, it causes the inclined inner wall of the collet to move rearward and push into engagement with the inclined wall of the arbor main body to radially expand the radially displaceable member to an engaged position for chucking of the machine part or workpiece, wherein the actuator member comprises an actuator ring or knob mounted at the back end of the arbor main body and coupled to the collet pusher member which, when rotated in one direction, causes the collet pusher member to release the machine part or workpiece that is chucked by the collet, and when rotated in the opposite direction, the actuator knob causes the collet pusher member to push the collet into abutment with the arbor main body and firmly hold the machine part or workpiece to be chucked.

2. A machine tool arbor as in claim 1, wherein the actuator member is a knurled ring threaded on threads formed on a part of the back end of the arbor main body so as to move on the arbor main body along a longitudinal axis in parallel with the arbor main body.

3. A machine tool arbor as in claim 1, wherein the actuator member is a rotatable knurled ring rotatably mounted in a stationary position at the back end of the arbor main body and having threading engaged with threads formed at on a back end of a the collet pusher member so as to move it along a longitudinal axis in parallel with the arbor main body.

4. A machine tool arbor for holding a rotating machine part or workpiece fitted with an actuator member for tool-less chucking and unchucking of a machine part or workpiece, comprising:

an arbor main body extending longitudinally along a longitudinal axis from a back or distal end to a front or proximate end;

a collet having a radially expandable and collapsible flex member provided between its inner walls and the arbor main body for chucking and unchucking a machine part or workpiece sleeved thereon, a collet pusher part movable in forward and rearward directions along the longitudinal axis of the arbor main body to push against and release from the collet flex member, an actuator member threaded on threads formed on an exterior surface on the back end of the arbor main body and coupled to the collet pusher member so as to move it in forward and rearward directions along the longitudinal axis of the arbor main body by threading and unthreading the actuator member, said collet pusher member being arranged with said collet such that when the collet pusher member is moved in the forward direction, it pushes against the collet flex member and causes it to expand and push the collet radially outward to a radially disengaged position for chucking the machine part or workpiece, and when the collet pusher member is moved in the rearward direction, it releases the collet flex member and causes it to collapse radially to a radially disengaged position for unchucking of the machine part or workpiece, wherein the actuator member is an actuator ring or knob mounted at the back end of the arbor main body and coupled to the collet pusher member which, when rotated in one direction, causes the collet pusher member to move rearward and release the machine part or workpiece that is chucked by the collet, and when rotated in the opposite direction, causes the collet pusher member to move forward and firmly hold the machine part or workpiece to be chucked.

* * * * *